Figure 1:
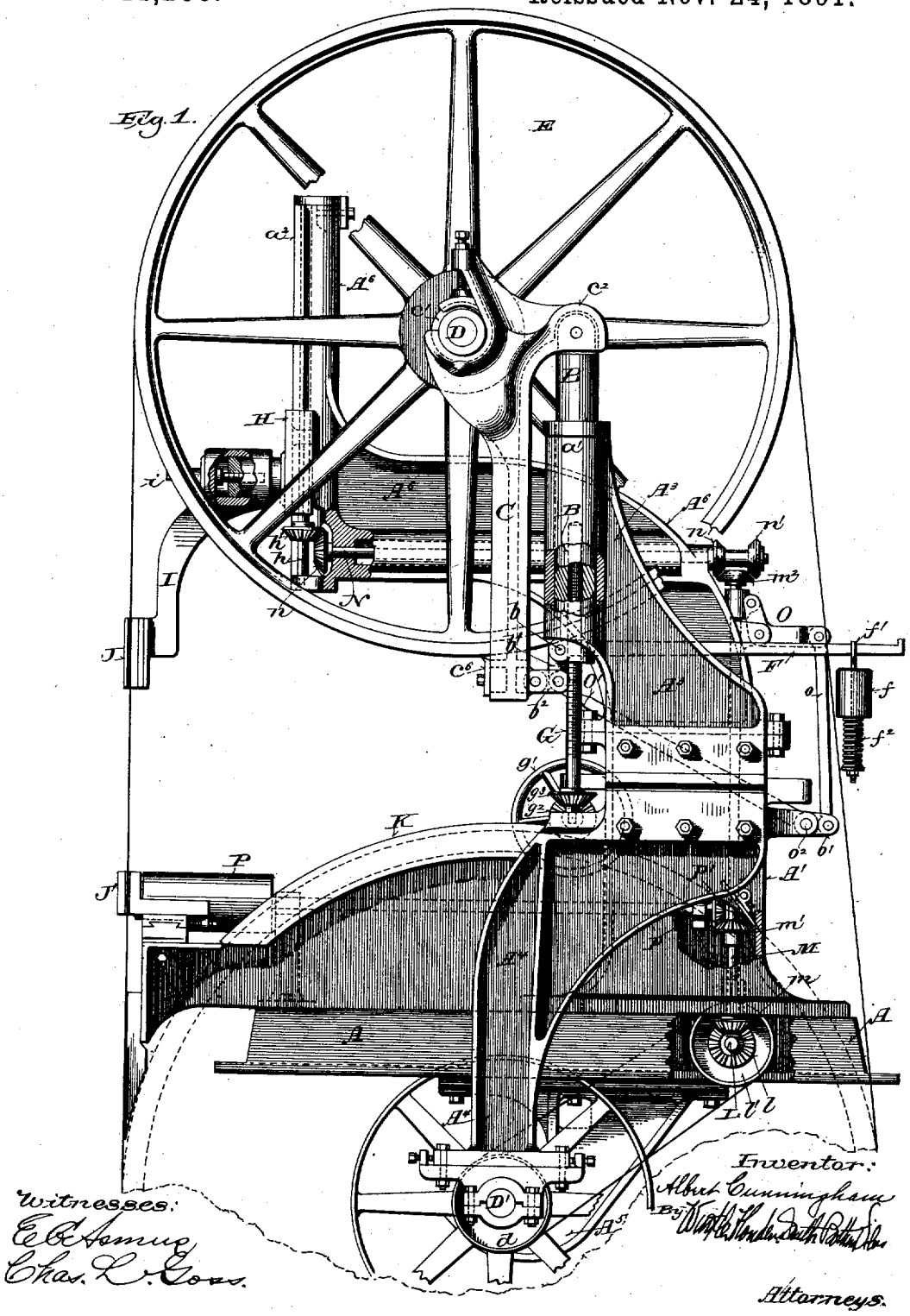

2 Sheets—Sheet 1.

A. CUNNINGHAM.

BAND SAW MILL.

No. 11,203. Reissued Nov. 24, 1891.

Witnesses:
E. C. Semmes
Chas. L. Goss.

Inventor:
Albert Cunningham
By Wright Brown & Quinby
Attorneys.

THE NORRIS PETERS CO., PHOTO-LITHO., WASHINGTON, D. C.

2 Sheets—Sheet 2.
A. CUNNINGHAM.
BAND SAW MILL.
No. 11,203. Reissued Nov. 24, 1891.
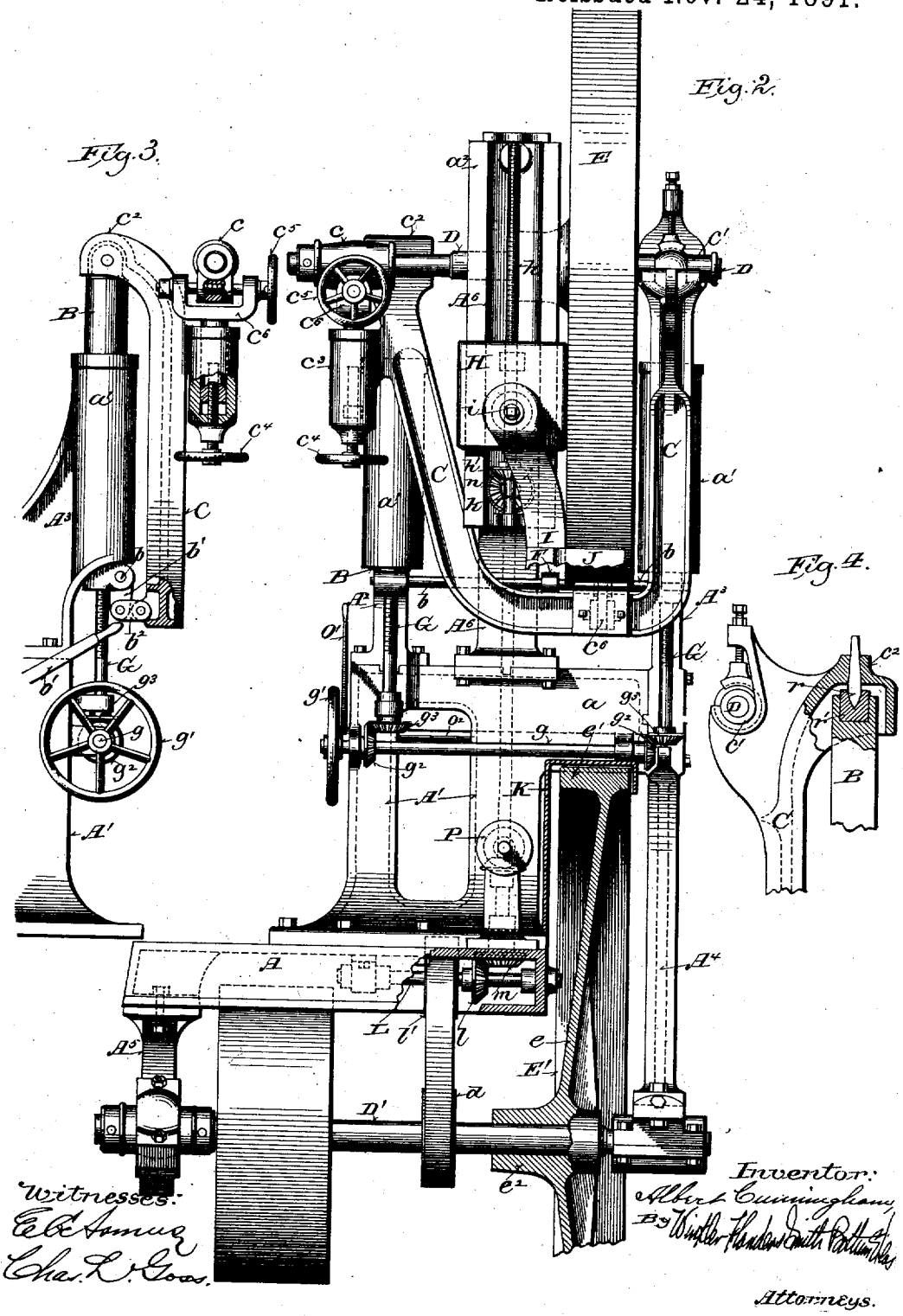
Witnesses:
E. E. Armug
Chas. L. Goss.
Inventor:
Albert Cunningham,
By Wright Brown & Quinby
Attorneys.
THE NORRIS PETERS CO., PHOTO-LITHO., WASHINGTON, D. C.

UNITED STATES PATENT OFFICE.

ALBERT CUNNINGHAM, OF MILWAUKEE, WISCONSIN.

BAND-SAW MILL.

SPECIFICATION forming part of Reissued Letters Patent No. 11,203, dated November 24, 1891.

Original No. 427,404, dated May 6, 1890. Application for reissue filed October 20, 1890. Serial No. 368,720.

*To all whom it may concern:*

Be it known that I, ALBERT CUNNINGHAM, of Milwaukee, in the county of Milwaukee and State of Wisconsin, have invented certain new and useful Improvements in Band-Saw Mills; and I do hereby declare that the following is a full, clear, and exact description of the invention, which will enable others skilled in the art to which it pertains to make and use the same, reference being had to the accompanying drawings, and to the letters of reference marked thereon, which form part of this specification.

The main objects of my invention are to provide a sensitive automatic adjustment of the upper band-wheel, whereby a uniform tension of the saw is maintained and the upper wheel is permitted to yield to any unusual and sudden strain upon the saw, to rigidly support the upper saw-guide and to facilitate its adjustment, to facilitate the vertical adjustment of the upper band-wheel support or bearings, to facilitate the manufacture of the machine by adapting various parts thereof to either a right or left mill to leave a wide clear space between the working side of the saw, the band-wheels, and the supporting frame or column, and to support the upper band-wheel shaft both before and behind the band-wheel, and at the same time provide for placing the saw upon or removing it from said band-wheel without disconnecting its bearings or supporting connections.

It consists, essentially, of bearings or of a yoke provided with bearings—one in front of and one behind the band-wheel—pivoted at one side to an adjustable support or supports, whereby the band-wheel is raised and lowered for saws of different lengths, of a yielding supporting-connection for said bearings or yoke, whereby an automatic yielding movement of said band-wheel is permitted to maintain the proper tension of the saw independently of said support or supports, of adjusting mechanism in connection with said yoke or bearings for raising and lowering the upper band-wheel, of a vertically and horizontally adjustable box in connection with said yoke, whereby the tail end of the upper band-wheel shaft is raised or lowered and moved laterally for the purpose of alignment, of an overhanging guide-supporting column provided with a vertically-movable slide which has a short guide-arm carrying the upper saw-guide, of a supporting column or frame having two uprights—one on each side of the upper band-wheel—which carry overhanging bearings for the upper band-wheel, whereby a wide clear space is left between said supporting frame or column and the working side of the saw and a firm support for the upper band-wheel bearings is provided on both sides of the band-wheel, of the combination, with a vertically-movable support for the upper band-wheel, of a weighted lever connected therewith, and a spring connection between the weight and lever, whereby a sudden depression of the upper band-wheel is caused to overcome the inertia of the weight gradually and the intermediate connections are relieved of sudden and excessive strain, and of other peculiarities of construction and arrangement hereinafter particularly described, and pointed out in the claims.

In the accompanying drawings like letters designate the same parts in the several figures.

Figure 1 is a front elevation of my improved band-saw mill. Fig. 2 is a side elevation of the same as viewed from the left with reference to Fig. 1. Fig. 3 is a rear elevation of the yoke carrying the upper band-wheel with its connections and the adjustable bearing supporting the tail end of the upper band-wheel shaft; and Fig. 4 is a detail illustrating a modification of the pivot-bearings of the yoke carrying the upper band-wheel.

The supporting-frame of the machine consists of a bed or base plate A, a pedestal A′, attached to the upper side thereof and formed with a horizontal projection *a* on the front side overhanging the lower band-wheel, a standard $A^2$, attached to said pedestal at or near its rear edge, a similar standard $A^3$, attached to the front face of the projection *a* of said pedestal, a depending bracket $A^4$, formed integrally therewith and provided at the lower end with an adjustable box for the front end of the lower band-wheel shaft, and a depending bracket $A^5$, attached to the under side of the base-plate A near its rear edge and provided at its lower end with an adjustable box for the rear end of said lower band-wheel shaft D′, and an overhanging or inverted-L-shaped bracket $A^6$, attached to the top of said pedestal A′, between the standards $A^2$ and $A^3$, so as to extend upwardly and horizontally just behind the upper band-wheel to a point near the working side of the saw and formed or provided at its overhanging end with vertical ways $a^2$ $a^2$. The standards $A^2$ and $A^3$ are formed with vertical tubular bearings $a'$ $a'$, in which are fitted the vertically-movable cylindrical slides B B, which are provided at their lower ends with bearings for the ends of a horizontal connecting-shaft $b$. (Shown most clearly in Fig. 2.)

C is a U-shaped yoke provided at its upper ends with boxes $c$ $c'$, which support the upper band-wheel shaft D, both in front of and behind the upper band-wheel E. The yoke C is also formed or provided at its upper ends on the side opposite the working side of the saw with horizontally-projecting arms $c^2$, which are pivoted or suitably fulcrumed to the upper ends of the cylindrical slides B B at points in the same or nearly the same horizontal plane with the axis of the shaft D.

The box carrying the tail end of the shaft D, as shown in Figs. 2 and 3, is supported in the yoke C, having a vertical stem, which is adjustably held in a socket $c^3$, provided therefor on the yoke C by means of an adjusting-screw $c^4$. Upon a horizontal adjusting-screw $c^5$, journaled in the forked ends of said yoke $c^6$, the box $c$ is mounted so as to be moved horizontally by turning said screw for the purpose of "cross-lining" or moving the tail end of said shaft D horizontally.

The box $c'$, supporting the front end of the shaft D, has a ball-and-socket or other suitable universal-joint connection with the front arm of the yoke C to permit of the adjustment of said shaft D, effected by means of the movement of the box $c$, above described.

The yoke C at the lower side, underneath the upper band-wheel E, is connected with the downwardly-projecting crank-arm $b'$ on the shaft $b$ by means of links $b^2$. To this shaft $b$, journaled, as previously described, in the lower ends of the vertical slides B B, is fixed a horizontal lever F, carrying near its outer end a weight $f$, adjustably suspended thereon by means of a rod $f'$, which extends through a vertical perforation therein. Between a nut or head on the lower end of said rod $f'$ and said weight $f$ is interposed a spring $f^2$, which allows a sudden depression of the band-wheel to gradually overcome the inertia of said weight, and thereby relieve the saw, the yoke carrying the upper band-wheel, and its connections from sudden and excessive strain.

To the yoke C is attached a scraper $c^6$ close to the rim of the upper band-wheel E. For the purpose of moving the slides B B vertically I provide the vertical adjusting-screws G G, which engage nuts provided therefor in said slides and have suitable fixed bearings at or near their lower ends. These screws are turned and the slides B B simultaneously raised or lowered by means of a horizontal shaft $g$, journaled in suitable bearings on the pedestal A′ and provided with a hand-wheel $g'$ or other suitable means for turning the same, and with bevel-gears $g^2$ $g^2$, which engage similar gears $g^3$ $g^3$ on the lower ends of the screws G G.

H is a slide adapted to be moved vertically on the ways $a^2$ $a^2$ at the overhanging end of the guide-supporting bracket $A^6$ by means of a vertical screw $h$, having suitable bearings in said bracket and working with a nut on said slide. To a horizontally-projecting stud on the outer face of the slide H is adjustably secured, by means of an adjusting-screw $i$, a short depending arm I, carrying on its outer end the upper saw-guide J.

J′ is the lower saw-guide, adjustably attached to the lower band-wheel guard K, or to any other suitable support, as shown in Fig. 1.

For the purpose of operating the upper guide J and turning the clearing-roller P, which is mounted upon a horizontal shaft $p$, just behind and adjacent to the lower guide J′, I provide a counter-shaft L, which is supported parallel with the lower band-wheel shaft D′ in suitable bearings on the under side of the base-plate A, and is connected by a pair of bevel-gears $l$ and $m$ with a vertical shaft M, having a laterally-movable bearing at its upper end.

In suitable bearings provided therefor in bracket $A^6$ is supported horizontally a shaft N, provided at one end with a bevel-gear $n$, which meshes with a similar gear $h'$ on the screw $h$ and at the other end with a pair of bevel friction-wheels $n'$ $n'$. The vertical shaft M is provided with a bevel-gear $m'$, which meshes with a similar gear $p'$ on the shaft $p$ and at its upper end with a bevel friction-wheel $m^2$, adjacent to and between the friction-wheels $n'$ $n'$ on the shaft N.

The movable box supporting the upper end shaft M is attached to one end of a bell-crank lever O, the other end of which is connected by a rod $o$ with a crank-arm $o'$ on a rock-shaft $o^2$, supported in suitable bearings on the pedestal A′ and provided at the rear end with a lever O′, by means of which the friction-driver $m^2$ is moved into engagement with either one of the pair of bevel friction-wheels $n'$ $n'$, and the upper guide thereby raised or lowered, as desired.

The counter-shaft L is provided with a pulley $l'$, connected by a belt with a pulley $d$ on the lower-band-wheel shaft D′, from which it is driven. The lower band-wheel E is cast integrally with a continuous cone-shaped web $e$ between its rim $e'$ and hub $e^2$. This construction permits of the contraction of the rim $e'$ without injury to the web $e$, which cools and solidifies before the rim, the cooling and consequent contraction of the rim simply producing a little sharper pitch or angle in the web without injuriously affecting the same.

The several parts composing the supporting-frame of the machine are made reversible, so as to adapt them to either a right or left mill. In place of the particular form of joint connection between the yoke C and the slides B, (shown in Fig. 1,) I may employ a pivot or fulcrum-joint like that shown in Fig. 4, consisting of a hardened bearing point or edge $r$, held in each laterally-projecting arm $c^2$ of yoke C, and resting in a hardened cup or stop $r'$ in the top of each slide B. The adjustment of the upper-band-wheel shaft may be effected by means of the independent movement of one of the pivot-bearings which support the yoke C, carrying the upper band-wheel, instead of by means of the independent adjustment of one of the boxes in which the upper-band-wheel shaft bears, as hereinbefore described. The slides B B may be made of any other suitable form than that shown in the drawings, and the ways in or on which they move constructed accordingly.

The standard $A^3$ and bracket $A^4$ may be formed separately and attached one to the upper side and the other to the under side of the projection $a$ on pedestal A′, said projection being extended a little farther forward for that purpose. In short, the details of construction and arrangement of the parts composing my improved mill may be variously modified without affecting its mode of operation or departing from the spirit of my invention.

By means of the construction hereinbefore described the upper band-wheel yields sensitively to variations in the tension of the saw, thereby relieving it of undue strain and maintaining the proper tension thereof as nearly uniform as practicable. This end is accomplished by pivoting or hinging the yoke carrying the upper band-wheel to supports horizontally to one side of the shaft D and providing a yielding connection between said yoke and a support, whereby the friction involved in the limited vertical movement of the upper band-wheel is reduced to the minimum. The construction described also facilitates the manufacture of the frame-work of the machine and affords a wider opening between the same and the working side of the saw, which is very desirable in operating the mill. The upper guide is rigidly supported and its adjustment readily effected without obstructing the space between the band-wheels, the supporting-frame, and the working side of the saw.

The vertically-movable slides, to which the yoke or bearings is pivoted, afford means for permanently adjusting the upper band-wheel to accommodate saws of different lengths and for raising and lowering the same in order to place the saw thereon or remove it therefrom independently of the mechanism by which the aforesaid automatic yielding movement of the band-wheel is permitted.

It will be observed that while the upper-band-wheel shaft has bearings both in front of and behind the band-wheel their supports and adjusting connections are located within the plane of the saw, so as not to interfere with placing the saw upon or removing it from the upper band-wheel.

By "plane of the saw" is intended a plane produced by the extension of the saw-blade in the direction of its width when the same is in working position upon the band-wheels.

The yoke C may be made in two distinct parts or two separate supports for the band-wheel shaft, each pivoted independently of the other to the frame of the machine and each having a separate connection with the weighted lever.

The arms $c^2$ $c^2$ of the yoke C are formed with inverted cups or recesses, which set over the tops of slides B B and prevent the displacement of the upper band-wheel in case the pivotal bearings are broken or disconnected.

I claim—

1. In a band-saw mill, the combination, with the upper band-wheel and its shaft, of unyielding pivot-supports located one before and one behind the band-wheel, vertically-movable front and rear bearings for said band-wheel shaft pivoted at one side to said supports inside of the plane of the saw in a line parallel, or nearly so, with said shaft, a yielding support for said bearings allowing a limited vertical movement thereof upon their pivot-supports, whereby an automatic yielding movement of the band-wheel is permitted to maintain the proper tension of the saw, and a connection passing around the periphery of the band-wheel between said bearings, whereby they are compelled to move together and the proper alignment of said shaft is maintained, substantially as and for the purposes set forth.

2. In a band-saw mill, the combination, with the upper band-wheel and its shaft, of unyielding pivot-supports located one before and one behind the band-wheel, said supports being vertically adjustable, so as to raise and lower said band-wheel for saws of different lengths, vertically-movable front and rear bearings for said band-wheel shaft pivoted at one side to said supports in a line parallel, or nearly so, with said shaft, a yielding support for said bearings allowing a limited vertical movement thereof upon said pivot-supports, whereby an automatic yielding movement of said band-wheel is permitted to maintain the proper tension of the saw, and a connection passing around the periphery of the band-wheel between said bearings, whereby they are compelled to move together and the proper alignment of said shaft is maintained, substantially as and for the purposes set forth.

3. In a band-saw mill, the combination, with the upper band-wheel, its shaft, and boxes, of a supporting-frame having two vertically-adjustable unyielding pivot-supports, one in front and the other behind said band-wheel and both inside of the plane of the saw, box-supporting members carried at one side of said band-wheel shaft upon said pivot-supports, and a yielding connection for said box-supporting members, whereby said band-wheel is permitted to yield and the tension of the saw is maintained, substantially as and for the purposes set forth.

4. In a band-saw mill, the combination, with the upper band-wheel and its shaft, of an unyielding adjustable pivot support or supports for the bearings of said band-wheel by which it is raised or lowered for saws of different lengths, a yoke provided in front of the band-wheel with a universal bearing and behind the band-wheel with a transversely-adjustable bearing for said shaft and pivoted at one side to said support or supports, and a yielding support for said yoke arranged to operate without changing the position of said pivot support or supports, whereby an automatic yielding movement of the band-wheel is permitted to maintain the proper tension of the saw independently of the movement of said pivot support or supports, substantially as and for the purposes set forth.

5. In a band-saw mill, the combination, with the upper band-wheel and its shaft, of unyielding adjustable pivot-supports, bearings having pivotal connections with said supports at one side of said shaft, one in front of and the other behind the band-wheel, the front bearing having a universal connection with its support and the rear bearing being transversely adjustable, and a yielding support for said bearings arranged to operate without changing the position of said pivot-supports, whereby an automatic movement of the upper band-wheel is permitted to maintain the proper tension of the saw independently of the movement of said pivot-supports, substantially as and for the purposes set forth.

6. In a band-saw mill, the combination, with the upper band-wheel and its shaft, of adjustable pivot-supports, a screw or screws unyieldingly sustaining said pivot-supports, bearings pivoted to said supports at one side of said shaft, one in front of and the other behind the band-wheel, the front bearing for said shaft having a universal-joint connection with its support and the rear bearing being transversely adjustable, and a yielding supporting connection for said bearings arranged to operate without changing the position of said pivot-supports, whereby an automatic yielding movement of the upper band-wheel is permitted to maintain the proper tension of the saw independently of the movement of said pivot-supports, substantially as and for the purposes set forth.

7. In a band-saw mill, the combination, with the upper band-wheel and its shaft, of a yoke provided with suitable bearings for said shaft and with laterally-projecting arms which are pivoted horizontally to one side of said shaft to a suitable support, and a yielding connection between said yoke and said support, whereby a limited vertical movement is allowed to said band-wheel and the proper tension of the saw is maintained, substantially as and for the purposes set forth.

8. In a band-saw mill, the combination, with the upper band-wheel and its shaft, of two vertically-adjustable pivot-supports, one in front of and the other behind said band-wheel, a U-shaped yoke provided at its upper ends with suitable bearings for said shaft and with laterally-projecting arms which are pivotally connected with said supports, and a yielding connection between said yoke and a suitable support, substantially as and for the purposes set forth.

9. In a band-saw mill, the combination, with the upper band-wheel and its shaft, of two supporting-standards, one in front of and the other behind said band-wheel and each provided with a vertically-movable slide, means for raising and lowering said slides, a yoke provided with suitable bearings for said shaft and with laterally-projecting arms which are pivoted to said slides horizontally to one side of said shaft, and a yielding connection between said yoke and said slides, whereby the proper tension of the saw is maintained, substantially as and for the purposes set forth.

10. In a band-saw mill, the combination, with the upper band-wheel and its shaft, of two supporting-standards, each provided with a vertically-movable slide, one in front of and the other behind said band-wheel, a U-shaped yoke provided at its upper ends with suitable bearings for said shaft and with lateral projections which are pivoted to said slides horizontally to one side of said shaft, a horizontal rock-shaft journaled in said slides and provided with a weighted lever, and a crank-arm which is connected with said yoke, substantially as and for the purposes set forth.

11. In a band-saw mill, the combination, with the upper band-wheel and its shaft, of two supporting-standards, one located in front of and the other behind said band-wheel and each provided with a vertically-movable slide, a U-shaped yoke provided at its upper ends with suitable bearings for said shaft and with lateral projections which are pivoted to said slides horizontally to one side of said shaft, a yielding connection between said yoke and slides, whereby a limited vertical movement is allowed to said band-wheel and the proper tension of the saw is maintained, and means for adjusting one end of said shaft vertically and horizontally, substantially as and for the purposes set forth.

12. In a band-saw mill, the combination, with the band-wheels and saw, of a supporting-frame consisting of a base-plate, a pedestal mounted thereon to one side of the band-wheel shafts, supporting-standards mounted upon said pedestal, one in front of and the other behind the upper band-wheel, and suitable bearings for the upper band-wheel shaft pivotally connected horizontally to one side thereof with said standards, substantially as and for the purposes set forth.

13. In a band-saw mill, a supporting-frame consisting of a base or bed plate, a pedestal mounted thereon and having two supporting-standards, one in front of and the other behind said band-wheel, vertically-movable front and rear bearings for the upper band-wheel shaft connected with and projecting laterally from said standards toward the working side of the saw, whereby a clear space between the working side of the saw and the supporting-frame is afforded, and a connection between said bearings passing around the periphery of the band-wheel and compelling them in automatically yielding to variaions in the strain upon the saw to move together without changing the alignment of the band-wheel shaft, substantially as and for the purposes set forth.

14. In a band-saw mill, a supporting-frame consisting of a base or bed plate, a pedestal mounted thereon, two supporting-standards for carrying the upper band-wheel mounted upon said pedestal, and depending brackets provided with bearings for the lower band-wheel shaft, one attached to said pedestal and the other to said base-plate, and bearings for the upper band-wheel shaft connected with said standards horizontally to one side of said upper band-wheel shaft, substantially as and for the purposes set forth.

15. In a band-saw mill, a supporting-frame consisting of a base-plate, a pedestal mounted thereon, two standards carrying the upper band-wheel mounted upon said pedestal, bearings for the upper band-wheel shaft connected horizontally to one side thereof with said standards, and two depending brackets provided with bearings for the lower band-wheel shaft, one attached to said base-plate and the other to said pedestal, the several parts of said supporting-frame being reversible, whereby they are adapted either to a right or left hand mill, substantially as and for the purposes set forth.

16. In a band-saw mill, the combination, with the upper guide, of an overhanging bracket located behind the upper band-wheel and provided at its overhanging end with a vertical way, a slide movable thereon, and a short depending arm adjustably attached to said slide and carrying said guide at its lower end, substantially as and for the purposes set forth.

17. In a band-saw mill, the combination, with the band-wheels and upper guide, of a supporting-frame consisting of a pedestal located on the opposite side of the center of the mill from the working side of the saw, two standards carrying the bearings for the upper band-wheel mounted upon said pedestal, one in front of and the other behind said band-wheel, and an overhanging bracket mounted upon said pedestal behind the upper band-wheel and provided at its overhanging end with a vertically-movable slide, to which said guide is attached, substantially as and for the purposes set forth.

18. In a band-saw mill, the combination, with the upper guide, of a supporting-pedestal set to one side of the center of the mill, an overhanging bracket mounted upon said pedestal and provided at its overhanging end with a vertically-movable slide, and a short depending arm attached to said slide and carrying at its outer end said upper guide, substantially as and for the purposes set forth.

19. In a band-saw mill, the combination, with a vertically-movable yoke or support carrying the upper band-wheel, of a lever connected therewith and provided with a weight and a spring connection between said weight and lever, whereby the inertia of said weight is gradually overcome when the upper band-wheel is suddenly depressed, substantially as and for the purposes set forth.

20. In a band-saw mill, the combination, with the upper band-wheel and its shaft, of a pedestal set to one side of the center of the mill, two standards mounted thereon, one in front of and the other behind said band-wheel, and each provided with a vertically-movable slide, vertical screws having fixed bearings at their lower ends and working with nuts in said slides, a horizontal shaft geared with said screws, and means for turning the same, a yoke provided with suitable bearings for said band-wheel shaft and with lateral projections which are pivoted horizontally to one side of said band-wheel shaft to said slides, and a yielding connection between said yoke and said slides, substantially as and for the purposes set forth.

21. In a band-saw mill, the combination, with the upper band-wheel and its shaft, of adjustable pivot-supports, one before and one behind said band-wheel, which is raised or lowered thereby for saws of different lengths, a yoke provided with bearings for said shaft and pivoted at one side to said supports, and a yielding connection between said yoke and pivot-support, whereby an automatic yielding movement of the band-wheel is permitted to maintain the proper tension of the saw independently of the movement of said adjustable pivot-supports, the pivotal and yielding connections between said yoke and supports being inside of the plane of the saw, so as not to interfere with placing it upon or removing it from the band-wheel, substantially as and for the purposes set forth.

22. In a band-saw mill, the combination, with the upper band-wheel and its shaft, of a suitable supporting-frame, a yoke provided with bearings for said shaft, and laterally-projecting arms, with inverted cup-shaped recesses set over upturned projections on said frame, to which said arms are pivoted, and a yielding connection between said yoke and frame, substantially as and for the purposes set forth.

23. In a band-saw mill, the combination, with the upper band-wheel and its shaft and the upper guide, of a supporting pedestal or frame located on the opposite side of the center of the mill from the working side of the saw and provided with bearing-supports for said band-wheel shaft, one in front of and the other behind said band-wheel, and with an overhanging bracket projecting toward the working side of the saw above the clear space between the band-wheels and terminating in a vertical way, and a shoe or slide movable in or upon said way and provided with an arm which carries said upper guide, substantially as and for the purposes set forth.

In testimony that I claim the foregoing as my own I affix my signature in presence of two witnesses.

ALBERT CUNNINGHAM.

Witnesses:
CHAS. L. GOSS,
E. G. ASMUS.